Sept. 10, 1935. T. ROBINSON 2,013,808
PROCESS FOR PULVERIZING SEMISOLID MATERIALS
Filed Dec. 17, 1929
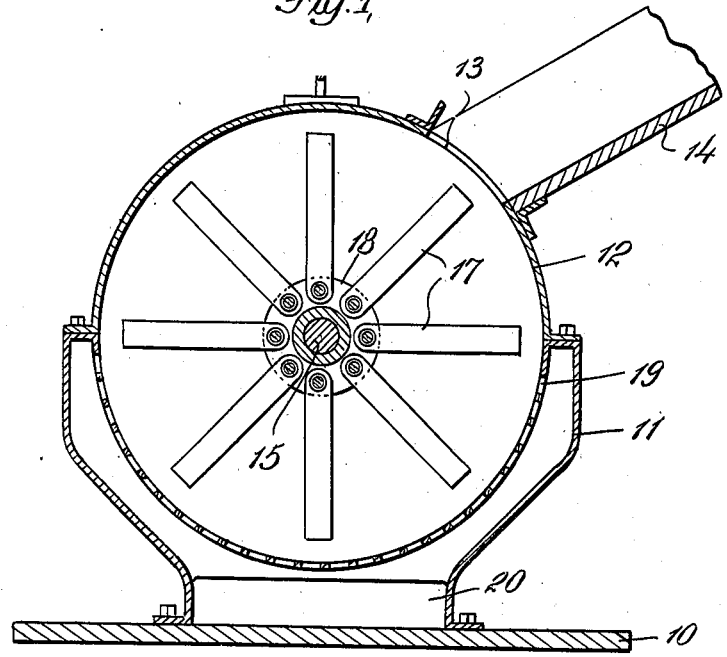
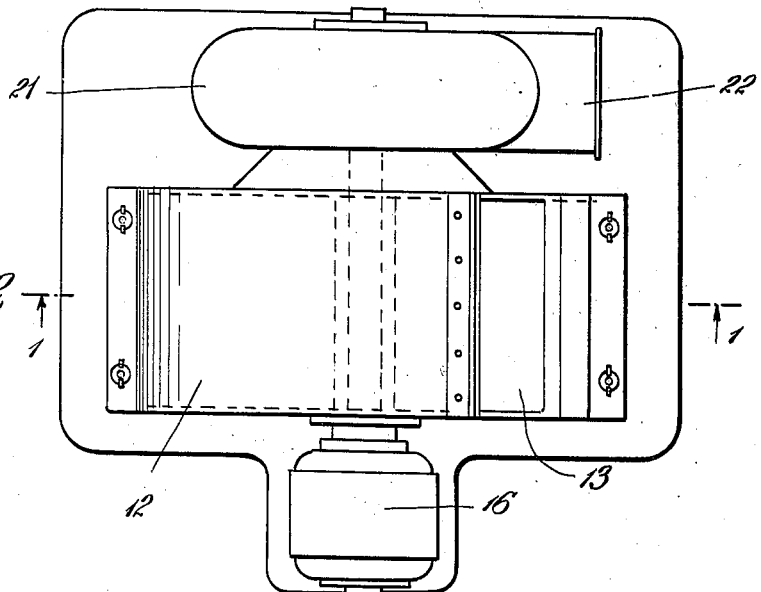

Patented Sept. 10, 1935

2,013,808

UNITED STATES PATENT OFFICE

2,013,808

PROCESS FOR PULVERIZING SEMISOLID MATERIALS

Thomas Robinson, New York, N. Y., assignor to Lancaster Asphalt, Inc., New York, N. Y., a corporation of Delaware Application December 17, 1929, Serial No. 414,691

10 Claims. (Cl. 83—94)

This invention relates to the pulverization of semi-solid substances, such as bituminous compounds, and is concerned more particularly with a method by which asphalt and the like may be reduced to a state of pulverization in which form it may be used for many useful purposes in the arts. The invention is further concerned with a pulverized material which has the usual characteristics of asphalt of a selected melt point, but which retains its pulverized condition without coalescence for indefinite periods.

By reason of its extremely sticky, gummy character, asphalt is en extremely difficult material to handle and use and when employed for most purposes, it has to be heated and used in molten condition or else converted into an emulsion by mixture, under proper conditions, with water and an emulsifying agent such as clay. In the laying of built-up roofs, the formation of expansion joints in pavement, and in similar operations, the asphalt is commonly shipped to the job in drums in which it forms a solid mass, and the mass is removed from the drum and melted down in heated tanks. This process is costly and inconvenient.

Conversion of the asphalt into an emulsion increases the cost of use and since emulsions contain substantial amounts of water, a large part of the freight charges for shipping emulsions represents charges for transporting water.

It has long been recognized that asphalt in pulverized form could be used on the job at much less expense than hot asphalt, and would serve many purposes for which emulsion is now employed, but so far as I am aware pulverization has never been successfully carried on heretofore on a commercial scale, except in connection with asphalts of relatively high melt point, such as 300° F. Asphalts of that type are known as "mineral rubber", and they can be ground and pulverized in ordinary mills. By reason of their high melt point, such asphalts cannot be used in pulverized form to replace hot asphalt or asphalt emulsions, because the particles will not flow together and solidify except upon exposure to a high degree of heat and this asphalt has not the ductility which is desirable for most purposes.

Pulverized asphalt of 220° melt point and under, however, can be applied in reduced form in roofing and similar coating operations, and the lower the melt point the more readily the particles flow together and coalesce, and the simpler are the operations of applying the material. But these characteristics of low melt point asphalts are the very ones which increase the difficulties of reduction and when attempts have been made to pulverize such asphalts by ordinary methods and equipment, the operations have proved unsuccessful because the asphalt quickly clogs the apparatus and forms a sticky, gummy mass which can be removed only with utmost difficulty and labor.

As a result of extensive experiments in this field, I have found that asphalt of the desired low melt points can be readily pulverized and reduced to a condition in which it may be used for the numerous purposes for which hot asphalt or asphalt emulsions are now employed, provided the reducing operations are carried on under proper conditions and in a particular manner. By this new method, I have successfully pulverized asphalt of as low melt point as 110° by the use of simple inexpensive equipment.

According to the new method, the asphalt is first crushed or broken up in any desired or convenient manner to reduce the mass to pieces about three inches or less in diameter. These pieces are then introduced into a pulverizing zone where they are subjected to the action of a plurality of high speed impact members or hammers. The asphalt is not crushed or ground between a pair of surfaces in the usual manner in this zone but is struck while in the air by the hammers, and the speed of the latter is such that the pieces of asphalt do not stay in contact with the hammers for more than the briefest instant but are thrown against the wall of the zone and bounce back to be struck again. Due to the inertia of the pieces of asphalt entering the zone and the speed at which the hammers move, the impact of the latter on the asphalt breaks up and shatters the pieces and, by repeated operation, reduces the latter to the desired size.

A further and equally important feature of the method is the maintenance of the asphalt and the surfaces with which it comes into contact at a relatively low temperature. The impact of the hammers on the pieces of asphalt generates heat which if not dissipated would soon render the asphalt sticky and cause it to adhere to the hammers and other parts and soon clog the apparatus. To obviate this difficulty, I cause the heat to be carried away from the pulverizing zone continuously throughout the carrying on of the method, and for this purpose I cause a high velocity current of air to pass through the pulverizing zone to cool the hammers and the asphalt and keep the temperature of the latter below the degree at which stickiness occurs. This air current I utilize further to carry away the fines from the pulverizing zone.

By carrying out the operations in the manner and under the conditions specified, I have found it possible to reduce asphalt of a melt point which it was thought hitherto impossible to pulverize, but for best results, particularly with asphalts of 150° and lower melt points, I have found it desirable to incorporate a further step in the method. This step involves mixing with the asphalt to be treated a proportion of a non-stick material such as slate dust, talc or the like and subjecting the mixture to the pulverizing operations. The addition of the dust improves the reduction and prevents clogging, and at the same time, a pulverized mixture is produced which retains its condition for indefinite periods. The presence of the desired proportion of dust in the pulverized asphalt not only prevents the particles from sticking together during storage and shipment but also gives body to the mass so that when the mixture is used as a coating or filler, for example, improved results are obtained. The dust does not interfere in any way with the use of the asphalt in the normal manner, and when the powdered mixture is applied as a coating and rolled in place for example by a hot roll, the asphalt appears to absorb the dust, so that the finished coating has the ordinary appearance and characteristics of an ordinary asphalt. The pulverized mixture may thus be used in place of asphalt for all ordinary purposes.

For a better understanding of the method reference may be had to the accompanying drawing, in which Fig. 1 is a schematic cross-sectional view through conventional apparatus which may be employed in carrying out the new method, and Fig. 2 is a plan view of the apparatus shown in Fig. 1.

The apparatus illustrated in the drawing is merely intended to be representative of the type by which the new method may be carried on rapidly and inexpensively.

Mounted on a suitable base 10 is a housing 11 on top of which is removably mounted a cover 12 having an admission opening 13 to which leads a feed chute 14. Within the housing is a shaft 15 mounted to rotate in suitable bearings and driven in any convenient manner as by a high speed motor 16. The shaft carries a plurality of hammers 17 which are pivotally mounted, preferably between plates 18 keyed or otherwise secured to the shaft, the hammers occupying radial positions when the apparatus is operating due to a centrifugal force but being free to yield against the centrifugal action at the instant of impact.

In the lower part of the housing is a screen 19 having openings about 1½" in diameter and relatively closely spaced and below the screen the housing has an outlet opening 20 which is connected to the intake of a blower or fan 21. This fan may be mounted to be driven by the motor through shaft 15 or may be separately driven as desired. The fan casing has an outlet 22 through which the air and pulverized material pass to a suitable separator.

In practicing the method in the reduction of 220° melt point asphalt, for example, the asphalt is broken up into small pieces and they are fed into the pulverizing zone defined by the cover and screen. The shaft is rotating counter-clockwise at a high speed, for example 3000–3500 R. P. M. and as the asphalt falls into the zone in the path of the hammers, the pieces are struck by the hammer and shattered by the impact. Some of the fragments may be thrown against the inner wall of the cover by this action and the fragments in that event, bounce back and are struck again. During these operations, the fan is drawing air at high velocity through the zone and heat generated is carried away and dissipated so that the temperature within the zone does not rise materially and never approaches the degree at which coalescence of the asphalt particles occurs. The fines pass through the screen and out through the fan and are discharged into a separator.

In pulverizing asphalt of lower melt points down to 110°, it is possible to use the same method but when such pulverized asphalt is stored at normal temperatures, there is a tendency for the particles to pack together and adhere by their own weight, and this tendency is more pronounced, the lower the melt point. When the pulverized material is to be used at once, the tendency to coalescence is not only unobjectionable but highly desirable, since it simplifies the operations that might otherwise be required to produce the desired homogeneous coating or filling. But the pulverization is improved and a more stable product is obtained in the case of lower melt point asphalts when a non-stick material is used. Also the final product is improved since it has more body and is more rigid and has less tendency to soften and flow under solar heat, when such material is intermingled with the asphalt.

I have found, for example, that when 110° melt point asphalt and slate dust are mixed in the proportions of 40–60 asphalt to 60–40 dust, and this mixture pulverized by the new method, the pulverization can be carried on without difficulty, and the mixture is fairly stable and retains its pulverized condition for substantial periods. Stability increases with the rising of the melt point, so that pulverized 110° melt point asphalt and dust must be used more promptly than a mixture including 150° melt point asphalt, in order to avoid coalescence of the particles. A mixture of the latter type retains its pulverized condition almost indefinitely and is, accordingly, perhaps more desirable, although its use requires more heat or tamping or rolling to form the desired continuous coating or filling.

The incorporation of the non-stick material also serves the further purpose of reducing the cost. Slate dust is a waste product which has few uses at present and can thus be obtained at little expense. In the final mixture, it takes the place of an equivalent amount of asphalt which is considerably more expensive.

Pulverized asphalt of the type described, either alone or in mixture with dust may be mixed with water and used after the fashion of ordinary asphalt emulsion. It offers substantial advantages over emulsion, however, in that in shipping it, no freight charges are incurred for transportation of water, and further asphalt emulsions must be kept from freezing, since the water present separates out on freezing and the emulsified condition can be restored only with great difficulty.

The pulverized asphalt produced by the method described, and either with or without a suitable proportion of non-stick material may be used with excellent results for coating purposes in accordance with the method set forth and described in my co-pending application, Serial No. 398,950 filed Oct. 11, 1929 and for the manufacture of molded products in accordance with the method and by means of the apparatus set forth and described in my co-pending application, Serial No. 391,297 filed September 9, 1929.

I claim:

1. A method of pulverizing semi-solid substances, which comprises subjecting pieces of the substances in a pulverizing zone to rapidly repeated impacts at high speed, and continuously passing a cooling medium at high velocity through said zone in intimate contact with the substances to maintain the zone and the substances therein at a temperature well below that at which the substances become soft, and withdrawing the pulverized substances in a current of the said cooling medium.

2. A method of pulverizing semi-solid substances, which comprises reducing the substances to pieces of convenient size, introducing the pieces into a pulverizing zone, shattering the pieces in said zone by rapidly repeated impact while the pieces are without support, continuously maintaining the pieces in said zone at a temperature well below that at which the substances become soft by causing a cooling medium to flow through said zone in contact with the pieces, and withdrawing the fines with said cooling medium.

3. A method of pulverizing asphalt of a given melt point, which comprises breaking up the asphalt into pieces, introducing the pieces into a pulverizing zone and subjecting the pieces to impact at high speed to shatter the pieces, and continuously passing a cooling medium through said zone in contact with said pieces in volume and at a velocity sufficient to maintain the pieces at a temperature well below said melt point, and to maintain the major portion at least of the fines in suspension in the cooling medium during the impacting step.

4. A method of pulverizing heat-softenable semi-solid substances, which comprises subjecting pieces of the substances in a pulverizing zone to rapidly repeated impacts while they are free to move under the influence of such impacts, and continuously drawing a cooling medium at high velocity through the said zone in contact with the substances thereby maintaining the zone and the substances therein at a temperature well below that at which the substances become soft, and continuously withdrawing the fines from the said zone while the same are in suspension in the cooling medium.

5. A method of pulverizing a low melting-point asphalt, which comprises mixing an asphalt having a melting point between 110° and 220° F., with slate dust in the proportions of from 40 to 60 parts of asphalt to from 60 to 40 parts of the slate dust, subjecting the mixture to rapidly repeated impacts while suspended in a gaseous cooling medium in a pulverizing zone while permitting free movement of the materials under the action of the impact, and continuously maintaining the mixture of materials at a temperature well below the melting point of the asphalt by continuously drawing the cooling fluid at high velocity through the pulverizing zone in intimate contact with the materials therein, and withdrawing the fines with the said cooling medium.

6. A method of pulverizing semi-solid substances, which comprises shattering the substances in a pulverizing zone by impact at high speed and without causing the substances to resist the impact action except by their own inertia, maintaining the zone and the substances therein at a temperature substantially below that at which the substances become soft by continuously flowing a high velocity current of a cooling medium in intimate contact with the substances being pulverized, and continuously withdrawing the pulverized substances from the zone in the said current of cooling medium.

7. A method of pulverizing asphalt of a given melting point, which comprises breaking up the asphalt into pieces, introducing the pieces into a pulverizing zone and subjecting them to rapidly repeated impacts at high speed to shatter the pieces while they are in suspension in a high velocity current of a cooling medium, thereby continuously maintaining the pieces in the said zone at a temperature well below the melting point of the asphalt.

8. A method of pulverizing a heat softenable solid substance, which comprises mixing the substance with a non-stick material and simultaneously impacting the substance and material while the same is suspended in a high velocity current of a gaseous cooling medium, and thereafter rapidly withdrawing the suspension of substance and material in the cooling medium.

9. A method of pulverizing asphalt comprising breaking the asphalt into pieces, mixing the asphalt pieces with finely pulverized slate dust, reducing the pieces to a pulverized form by rapidly repeated impacts, and cooling the pieces during the pulverizing operation by maintaining them in suspension in a high velocity current of a gaseous cooling medium.

10. A method of pulverizing thermoplastic substances, which comprises subjecting pieces of the substances in a pulverizing zone to rapidly repeated impacts while they are free to move under the influence of such impacts, and continuously drawing a cooling medium at high velocity through the said zone in contact with the substances thereby maintaining the zone and the substances therein at a temperature well below that at which the substances become soft, and continuously withdrawing the fines from the said zone while the same are in suspension in the cooling medium.

THOMAS ROBINSON.